United States Patent [19]

Keller

[11] Patent Number: 4,575,136
[45] Date of Patent: Mar. 11, 1986

[54] TANK CAP HAVING AIR ACTUATED LATCH

[76] Inventor: Russell D. Keller, 149 N. Lotus Beach Dr., Portland, Oreg. 97217

[21] Appl. No.: 579,269

[22] Filed: Feb. 13, 1984

[51] Int. Cl.$^4$ ............................................. E05C 9/06
[52] U.S. Cl. .................................... 292/33; 220/316; 220/DIG. 33; 292/144
[58] Field of Search ................... 292/33, 37, 170, 144, 292/256.65; 220/316, 260, 323, 367, DIG. 33

[56] References Cited

U.S. PATENT DOCUMENTS

| | | | |
|---|---|---|---|
| 1,560,489 | 11/1925 | Yager | 292/37 |
| 1,830,949 | 11/1931 | Lake | 292/37 X |
| 2,007,100 | 7/1935 | Varese | 220/DIG. 33 X |
| 2,530,628 | 11/1950 | Pivero | 292/33 |
| 3,338,455 | 8/1967 | Miller | 220/323 X |
| 3,449,860 | 6/1969 | Franks, Jr. et al. | 292/37 X |
| 3,893,723 | 7/1975 | Boule | 292/170 X |
| 4,294,376 | 10/1981 | Keller | 220/DIG. 33 X |
| 4,440,308 | 4/1984 | Baker | 220/DIG. 33 |

Primary Examiner—Richard E. Moore
Attorney, Agent, or Firm—Klarquist, Sparkman, Campbell, Leigh & Whinston

[57] ABSTRACT

A gas pressure actuated latch for a fuel tank cap or other container tank cap is disclosed. The cap body has formed therein a cylinder in communication with an air inlet passageway connected to an external air hose fitting for movement of a latch piston contained within the cylinder in response to the application of pressurized air. The piston is provided with a plurality of opening cam fingers which are urged against a corresponding number of slide latches to move such latches horizontally inward to open the latch when air is applied to the cylinder. This causes such latch members to slide inwardly away from beneath the lip of the fuel tank filler opening into an unlocked position in response to vertical movement of the piston. In addition, a closing cam member is resiliently biased by a coil spring upward against the piston so that its cam surfaces also engage the latch members to normally close the latch by sliding such latch members outward into a locked position beneath the lip of the fuel tank filler opening. The coil spring, closing cam member and the latch members are enclosed and held by a cup-shaped cage member attached to the cap body by fastening screws. When the force of the air pressure within the cylinder exceeds the force of the spring, the piston moves downward from the latch closed position and causes the opening cam surfaces thereon to open the latch so that the cap can be removed. This has the advantages of greater security and convenience in that the cap can be unlocked from a remote position, such as within a truck cab, but cannot be removed until it is so unlocked.

22 Claims, 9 Drawing Figures

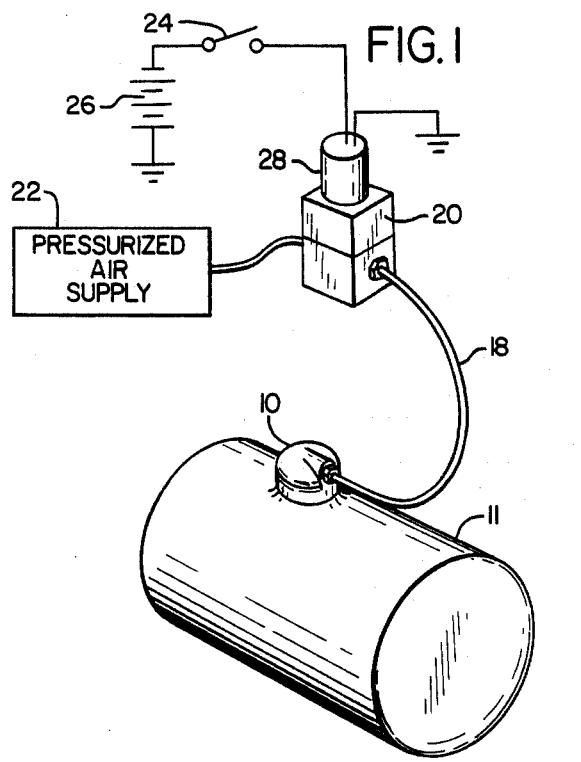
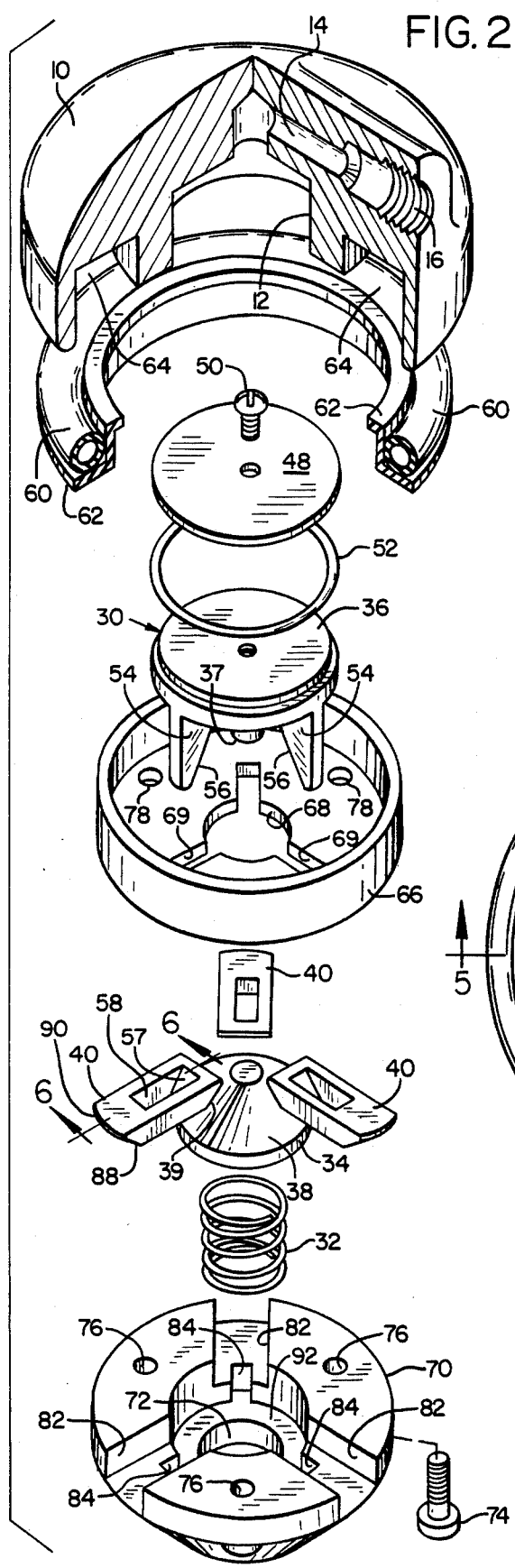
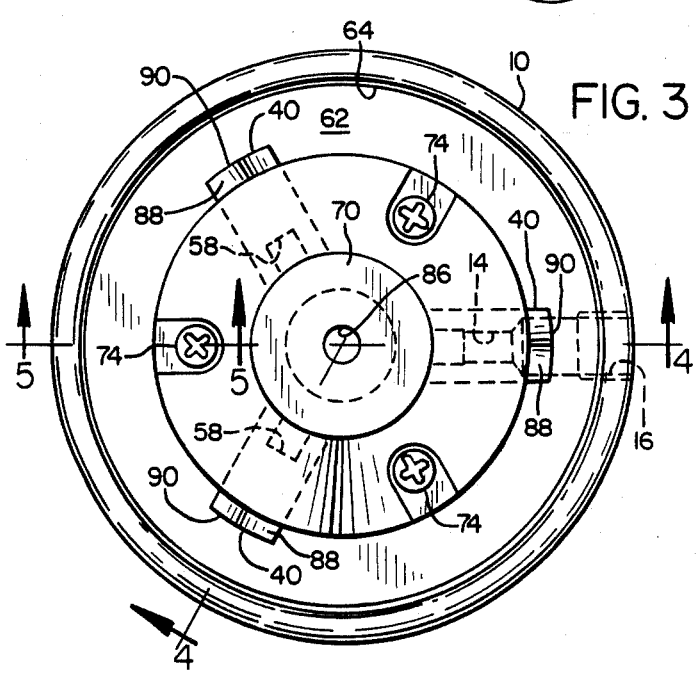
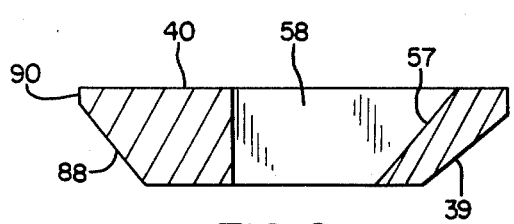

TANK CAP HAVING AIR ACTUATED LATCH

BACKGROUND OF INVENTION

The subject matter of the present invention relates generally to container tank caps having a remotely actuated lock, and in particular to such caps having latch means operated by gas pressure such as pressurized air. The present invention is suitable for use as a fuel tank filler cap such as those used on trucks and other motor vehicles.

Previously, fuel tank caps for automobiles and trucks have been provided with key operated latch means for locking the cap on the fuel tank filler opening to prevent theft of fuel. However, this has the disadvantage that the key may become lost and also requires that the key be transferred from the driver to the service station attendant for unlocking the cap before fuel can be transmitted into the fuel tank. This is extremely inconvenient and if the key is lost the fuel cap cannot be removed. In order to avoid this inconvenience and to provide greater security for locking the tank cap, an air actuated latch means is employed in the tank cap of the present invention. The latch is remotely operated by the driver, for example, while located in his cab merely by opening a suitable air valve such as an electrical switch actuated solenoid valve. The latch may be operated by pressurized air from the same source of air pressure supplying the air brakes or air clutch of the truck or other motor vehicle. Thus, there is very little increased cost for extra equipment when employing the tank cap of the present invention.

The air actuated latch of the present invention is reliable and trouble-free in operation because, among other things, there are no external parts to become dirty. In addition, the tank cap and air latch are resistant to damage by vandalism because all parts are contained within the cap and the fuel tank filler tube. Furthermore, the tank cap cannot be lost because it is permanently attached to an air hose fitting fixed to the vehicle body.

SUMMARY OF INVENTION

It is therefore one object of the present invention to provide an improved container cap having a locking mechanism which may be actuated at a remote location from the tank for greater convenience.

Another object of the invention is to provide such a tank cap and locking mechanism in which a gas pressure actuated latch means is employed for releasing such latch means in a safe, convenient and trouble-free manner.

A further object of the invention is to provide such a tank cap and locking mechanism of greater security to prevent the theft of fuel from the tank and which is resistant to vandalism.

An additional object of the present invention is to provide such a tank cap and locking mechanism which is suitable for use as a fuel tank filler cap and has an air pressure operated latch means of reliable and trouble-free operation since all parts of the latch means are attached to the cap and are contained within the cap or the fuel tank filler tube so they will not become dirty or damaged.

Still another object of the invention is to provide such a tank cap and locking mechanism in which the latch is normally resiliently biased by a spring in a locked position, and is unlocked by applying air pressure to a cylinder within the cap for movement of a piston therein to which is attached opening cam means for unlocking the latch.

A still further object of the invention is to provide such a cap and locking mechanism employing a separate spring biased closing cam means and in which the latch is locked and unlocked by sliding latch members which are normally urged outwardly by the closing cam means into engagement with the lip of the filler opening in a locked position and are moved inwardly by the opening cam means out of engagement with such lip in an unlocked position to provide a simple, accurate and inexpensive locking mechanism.

DESCRIPTION OF DRAWINGS

Other objects and advantages of the present invention will be apparent from the following detailed description of a preferred embodiment thereof and from the attached drawings of which:

FIG. 1 is an oblique elevation view of fuel tank and tank cap with associated latch operating apparatus in accordance with the present invention;

FIG. 2 is an exploded view of the tank cap of FIG. 1;

FIG. 3 is an enlarged bottom elevation view of the tank cap of FIGS. 1 and 2;

FIG. 6 is an enlarged section view taken along the line 6—6 of FIG. 2; and

DESCRIPTION OF PREFERRED EMBODIMENT

Figure 4A:
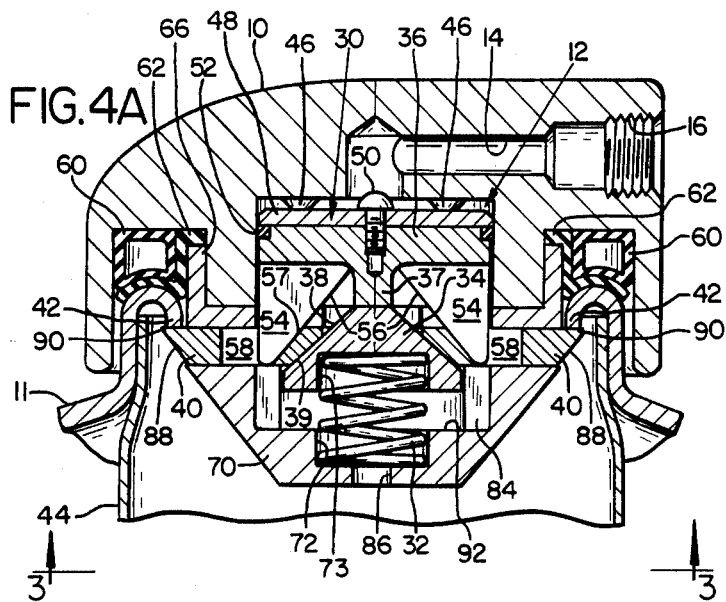
FIGS. 4A, 4B and 4C are section views taken along the line 4—4 of FIG. 3 of the cap in a locked position, an unlocked position and a partially closed position, respectively.

As shown in FIGS. 1 to 4, the tank cap apparatus of the present invention includes a cap body 10 made of non-corrosive metal, such as aluminum alloy, secured over the fill opening of a liquid container tank 11. All other parts of the cap apparatus are made of similar metal unless otherwise indicated. The cap body 10 may be cast and then machined to provide a cylinder chamber or cavity 12 in the bottom of such cap which communicates through an air passage 14 to an air hose connector fitting secured to a threaded air inlet opening 16. A flexible hose 18 is connected from the fitting opening 16 through a valve 20 to a source 22 of pressurized air or other gas. The valve 20 may be a mechanically actuated valve, but is preferably a solenoid valve which is electrically actuated by the closing of an electrical switch 24 having one terminal connected to a D.C. voltage source 26, such as a battery, and having its other terminal connected to a solenoid winding 28 which produces an electromagnetic field for opening the valve when electrical current flows therethrough. The valve 20 or its actuating switch 24 may be positioned within a truck cab or other remote location from the truck fuel tank or other container tank 11 to which the cap 10 is attached in order to enable remote operation of a latch supported on such cap.

The latch operating mechanism includes a piston 30 mounted within the cylinder cavity 12 for vertical sliding movement. The piston is normally urged upward into the locked position shown in FIG. 4A by a coil spring 32 of spring metal, such as stainless steel, which resiliently biases a latch closing cam member 34 into engagement with the bottom of a central portion 37 of the piston body 36. The latch closing cam member 34 is of a frustro-conical shape having a conical cam surface 38 on its top portion which engages a corresponding cam follower surface 39 on the inner end of each of three sliding latch members 40, thereby causing such latch members to slide horizontally outward into a locked position. In the locked position the outer ends of latch members 40 engage the bottom edge of a lip 42 on the fuel tank 11 surrounding the filler opening in such tank within which a filler tube 44 is mounted. As a result, the latch members 40 are held in the locked position of FIG. 4A by the latch closing cam member 34 and the force of the coil spring 32.

Three piston spacer bumps 46 are provided within the cylindrical cavity 12 extending downward from the top of such cavity in position to engage a seal retainer plate portion 48 of the piston 30 which is attached to the top end of the piston body 36 by a fastening screw 50. The seal retainer plate 48 retains a seal member 52, such as a rubber O-ring, within an annular slot in the outer surface of the piston body 36 to form a gas-tight seal between such piston body and the side of the cylindrical cavity 12.

The piston body 36 has three latch opening cam fingers 54 extending downwardly therefrom that are provided with sloping cam surfaces 56 which engage a corresponding cam follower surface 57 within a notch 58 in each of the sliding latch members 40. As a result, when pressurized air is supplied into the cylinder 12 through passageway 14 and the piston 30 is moved downward into the unlocked position shown in FIG. 4B, cam surface 56 on the cam fingers 54 engage the latch members 40 and cause such latch members to slide inwardly of lip 42 to open the latch. This enables the cap body 50 to be moved up a short distance by the resiliency of a tubular seal member 60 made of polyurethane or other elastomer material which is provided with air holes through the wall of the tube uniformly spaced along the length of the tube. A sealing ring gasket 62 of elastomer material, such as buna N rubber, is provided within a annular notch 64 provided in the bottom of the cap body 10 below the tubular seal 60 and is clamped between the cap body and a retainer cup 66 whose upper edge engages the gasket. The retainer cup 66 holds the piston 30 within the cylinder cavity 12. Such retainer cup is provided with a central opening 68 through which extends the top of the closing cam member 34 and the bottom of the central portion 37 of the piston body 36. In addition, three slots 69 in the retainer cup communicate with such central opening and extend radially outward therefrom to accommodate the three opening cam fingers 54 on the piston body 36 to enable the fingers to pass through such retainer cup during opening and closing of the latch.

Figure 5:
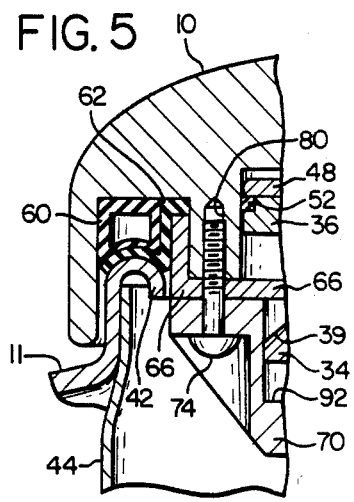
FIG. 5 is an enlarged section view taken along line 5—5 of FIG. 3.

A slide cage member 70 of an inverted frustro-conical shape is fastened beneath the slide latch members 40, the closing cam member 34 and the spring 32 to secure them to the bottom of the cap body 10. The spring is held within a central cavity 72 provided in the bottom of cage member 70 and a similar cavity 73 in the bottom of the closing cam member 34. The cage member 70 is fastened to the cap body 10 by three fastener screws 74 extending through holes 76 in the slide cage, holes 78 in the retainer cup 66 and threaded holes 80 in the cap body 10 surrounding the cylinder cavity 12 as shown in FIG. 5. The slide cage is provided with three horizontal guide notches 82 in the upper edge thereof through which the latch members 40 slide when moved by the closing cam member 34 of the opening cam fingers 54. In addition, three vertical guide notches 84 are provided in the interior of the slide cage to guide vertical movement of the opening cam fingers 54 of the piston body. A vent opening 86 is provided centrally through the bottom of the slide cage 70 to enable fumes to vent through the cap from the fuel tank.

The three sliding latch members 40 each include a rectangular opening 58 which accommodates one of the opening cam fingers 54 so that its cam surface 56 engages the sloped cam follower surface 57 on the inner edge of the opening as shown in FIG. 6. Cam follower surface 57 is inclined at an angle of approximately 50° with respect to the horizontal. The inner end of each latch member 40 is provided with a second sloped cam follower surface 39 which is at an angle of approximately 40° with respect to the horizontal, and is engaged by the cam surface 38 on the closing cam member 34. The outer end of the latch member 40 includes a third sloping outer cam surface 88 which slopes at an angle of approximately 50° with respect to the horizontal and engages the side of the filler opening lip 42 for inward camming movement of the latch members during manual closure of the fuel cap. A substantially vertical outer edge 90 is provided on the outer end of the latch member which is curved horizontally and extends beneath the lip 42 of the tank in the locked position of FIG. 4A. It should be noted that the outer edge portion 90 has a radius of curvature about 1.30 inch which is approximately equal to the radius of the annular lip 42 in the horizontal plane, and such outer edge has a vertical dimension of approximately 0.05 inch while the overall length of the latch member is 1.10 inch. The cam opening fingers 34 have a sloping cam surface 56 which extends at an angle of about 50° with respect to the horizontal. However, the closing cam member 34 has a sloping cam surface 38 which forms an angle of about 40° with the horizontal plane. Thus, the angles of the cam surfaces 38 and 56 approximately match the angles of their cam follower surfaces 39 and 57, respectively.

Operation of the air actuated latch is as follows. First, air pressure is applied to the cylinder cavity 12 from pressurized air supply 22 through the hose 18 and passage 14 by opening the solenoid valve 20. The air pressure urges the piston 30 downward against the force of the spring 32 in FIG. 4B. When the air pressure reaches approximately 6.5 psi, the spring force is overcome and the piston starts to move downward. Then the cam surfaces 56 on the opening cam fingers 54 push against the cam follower surfaces 57 on the latch members 40 causing such latch members to slide radially inward. When the latch members 40 have moved inward sufficiently to clear the lip 42, the tubular seal member 60 and gasket 62 resiliently expand to their normal relaxed shape as shown in FIG. 4B to cause the cap body 10 to move upward approximately 0.125 inch from the dashed line position 10' to the solid line position 10. As the air pressure is further increased, piston 30 continues to travel downward retracting the latches further and compressing the spring until the closing cam member 34 reaches the upper surface 92 of the bottom of the slide cage 70. The tank cap is then removed manually. Even if the air pressure is relieved by closing the valve 20 in the unlocked position of FIG. 4B and the piston is driven back upwardly by the force of the spring 32 causing the latch members 40 to slide partially outwardly due to the camming of their cam surfaces 34 by the cam follower surfaces 37 of the latch member, there is no locking but the cap remains unlocked. This is because the outer edge 90 of the latch member is not beneath the lip 42 of the tank opening, but instead would be above the bottom of the lip so that the outer end cam surface 88 on such latch member would engage the side of the lip and would cam the latch cap upward to cause it to remain in the unlocked condition of FIG. 4B.

Figure 4B:
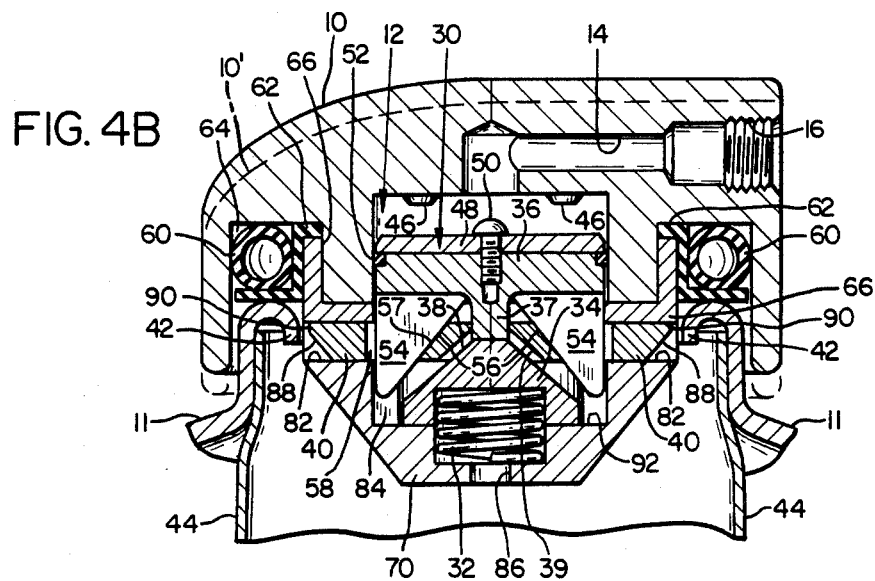
Figure 4C:
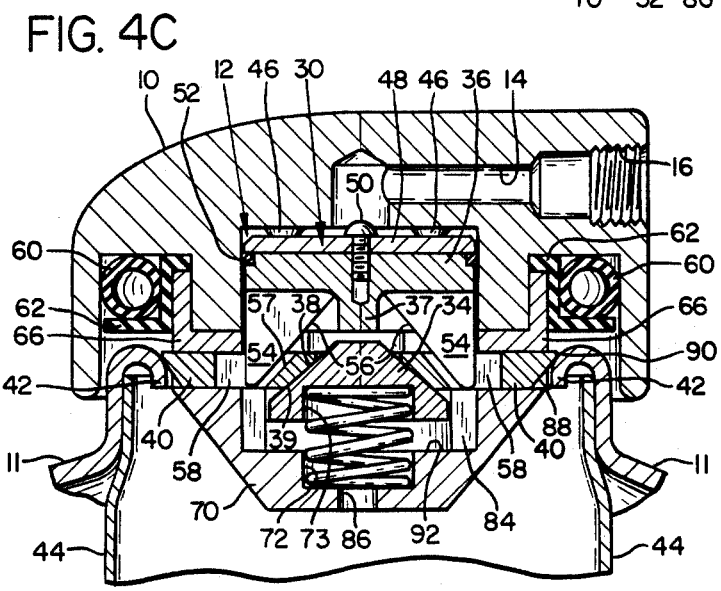

The tank cap can be replaced manually on the filler opening and locked by pushing it down in FIG. 4C into the locked position of FIG. 4A even if gas pressure is not used. Thus, as the cap body 10 is forced downward from the position of FIG. 4C into the position of FIG. 4A, the outer end cam surface 88 of the latch member 40 engages the side of the lip 42 and urges the latch members inwardly to compress the spring 32. When outer edge 90 of the latch member 40 is positioned beneath the lip 42 of the filler opening, the spring 34 causes the closing cam member 34 to move upward and to urge the latch members 40 outwardly into the locked position of FIG. 4A. Of course, with air pressure present in the cylinder 12, the latch members 40 are already in the retracted position of FIG. 4B without need for the camming of cam surfaces 88. The cap then may be more easily pushed downward in FIG. 4C against the resilient force of the tubular seal member 60 and gasket 62 until the outer edge 90 of the latch members is positioned below the lip 42 at which time the air pressure is then released to allow the spring to move the closing cam member 34 upward which causes the latch members to be cammed outwardly into the locked position of FIG. 4A.

Figure 7:
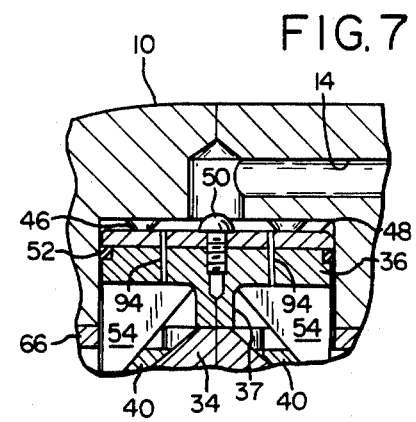
FIG. 7 is an enlarged partial section view of a second embodiment of the invention with gas vent openings through the piston.

A second embodiment of the filler cap apparatus of the present invention is shown in FIG. 7 which is similar to that of FIGS. 1 to 6 except that three vent openings 94 are provided through the piston 30. The vent openings extend substantially parallel to the axis of the cylinder chamber 12 through the piston body 36 and the retainer plate 48. As a result, gas formed within the container tank 11 is vented out of the tank through central vent opening 86 in the slide cage member 70 and through the piston vent openings 94 to the inlet passage 14. The gas is transmitted out of the passage 14 through the air hose or other gas conduit 18 to the valve 20 which is normally spring biased closed to vent the conduit 18 to the atmosphere. Thus, when valve 20 is opened by closing switch 24 to energize the solenoid coil 28, pressurized air flows from source 22 through such valve and conduit 18 into the cylinder chamber 12 to move the piston 30 down and unlock the latch members 40 as shown in FIG. 4B. However, when the valve 20 is closed, the outlet of the air supply 22 is closed and the spring 32 causes the piston 30 and the latch members 40 to return to the locked position of FIG. 4A. In the embodiment of FIG. 7 gas fumes are vented from the tank 11 to the atmosphere through vent openings 94, passage 14, hose 18 and valve 20 in the closed position of such valve. The piston vent holes 94 each have a small diameter of about 0.041 inch to reduce the amount of pressurized air which leaks through such holes in the unlocked position of FIG. 4B. As a result, 60.0 psi pressure is required in the embodiment of FIG. 7 to overcome the spring force and begin to move the piston down into the unlocked position.

This completes the description of the preferred embodiments of the invention. However, it will be obvious to those having ordinary skill in the art that many changes may be made in the details of the preferred embodiments. Therefore, the scope of the present invention should be determined by the following claims.

I claim:

1. Container tank filler cap apparatus, comprising:
   cap body member having a cylinder chamber therein;
   piston means mounted in said cylinder chamber;
   latch means mounted on said cap body member for sliding movement outward into a locked position beneath the lip of a tank filler opening, and inward into an unlocked position spaced from said lip;
   first cam means coupled to said piston means for moving said latch means inward into said unlocked position;
   second cam means biased toward said latch means for moving said latch means outward into said locked position; and
   air inlet means connected to said cap body member for supplying air pressure into said cylinder chamber, said air pressure causing the movement of said piston means and said first cam means, said movement of said first cam means causing said first cam means to contact and urge said latch means inward into said unlocked position.

2. Filler cap apparatus in accordance with claim 1 in which the second cam means includes a cam member which is urged into contact with the piston by the resilient bias force of a spring means so that the air pressure must exert a force on the piston greater than the force of the spring means on the cam member in order to move said first cam means and said latch means to said unlocked position.

3. Filler cap apparatus in accordance with claim 1 in which said second cam means is a tapered conical cam member which is resiliently urged by spring means into engagement with sloping cam surfaces on a plurality of latch members of the latch means to cause said latch members to slide radially outward.

4. Filler cap apparatus in accordance with claim 1 in which seal means including a resilient hollow sealing tube is provided in a recess within the cap body member in position to form a seal between said cap body member and the tank around the filler opening.

5. Filler cap apparatus in accordance with claim 1 in which the latch means includes a plurality of latch members each having a pair of separate cam follower surfaces which engage different ones of said first and second cam means.

6. Filler cap apparatus in accordance with claim 5 further comprising a cage member secured to said cap body member, said cage member containing said second cam means and a spring means for resiliently biasing said second cam means, said latch members being mounted for sliding movement between said cap body member and said cage member.

7. Filler cap apparatus in accordance with claim 6 in which the latch members are each provided with a retaining aperture into which extend one of a plurality of cam fingers of the first cam means to retain said latch members in the filler cap.

8. Filler cap apparatus in accordance with claim 5 in which the latch members each have a third cam surface on their outer ends to be engaged by the side of the lip of the filler opening to cam said latch members inward to said unlocked position when the filler cap is being inserted into the filler opening.

9. Container tank filler cap apparatus, comprising:
cap body member having a cylinder chamber therein;
piston means mounted in said cylinder chamber;
latch means mounted on said cap body member for movement between a locked position and an unlocked position on a container tank filler opening;
first latch control means coupled to said piston means for moving said latch means into said unlocked position;
second latch control means for moving said latch means into said locked position by resiliently biasing said latch means into said locked position; and
gas inlet means connected to said cap body member for supplying gas pressure into said cylinder chamber, said gas pressure causing the movement of said piston means and said first latch control means, said movement of said first latch control means causing said first latch control means to contact and urge said latch means into said unlocked position.

10. Filler cap apparatus in accordance with claim 9 in which said first latch control means comprises a first cam means, and said second latch control means comprises a second cam means.

11. Filler cap apparatus in accordance with claim 10 in which the second cam means includes a cam member which is resiliently urged into contact with the piston by spring means so that the air pressure must exert a force on the piston greater than the force of the spring means on the cam member in order to move the first cam means and the latch means to said unlocked position.

12. Filler cap apparatus in accordance with claim 11 in which the second cam means is a tapered conical cam member which is resiliently urged by spring means into engagement with sloping cam surfaces on a plurality of latch members of the latch means to cause said latch members to slide radially outward.

13. Filler cap apparatus in accordance with claim 9 in which a seal means including a resilient tubular sealing gasket is mounted within an annular channel in the cap body member in position to engage the tank around the filler opening.

14. Filler cap apparatus in accordance with claim 10 in which the latch means includes a plurality of latch members each having a pair of separate cam surfaces which engage different ones of said first cam means and said second cam means.

15. Filler cap apparatus in accordance with claim 14 further comprising a cage member secured to said cap body member, said cage member containing said second cam means and a spring means for resiliently biasing said second cam means, said latch members being mounted for sliding movement between said cap body member and said cage member.

16. Filler cap apparatus in accordance with claim 14 in which the latch members are provided with retaining apertures into which extend cam fingers of the first cam means to retain said latch members in the filler cap.

17. Filler cap apparatus in accordance with claim 14 in which the latch members each have a third cam surface on their outer ends to be engaged by the side of the lip of the filler opening to cam said latch members inward to said unlocked position when the filler cap is being inserted into the filler opening.

18. Filler cap apparatus in accordance with claim 16 in which the latch members each have a first sloping cam surface at one end which engages a tapered cam member of said second cam means and have a second sloping cam surface in the retaining aperture which engages one of the cam fingers of said first cam means.

19. Filler cap apparatus in accordance with claim 9 in which the gas inlet means includes an inlet passage through the cap body member to the cylinder chamber and an air hose connected to said inlet passage for supplying air pressure to said cylinder chamber to open the filler cap.

20. Container tank filler cap apparatus, comprising:
cap body member having a cylinder chamber therein;
piston means mounted in said cylinder chamber;
vent means including at least one vent opening in said piston means for venting gas from the container tank;
latch means mounted on said cap body member for movement between a locked position and an unlocked position on a container tank filler opening;
first latch control means coupled to said piston means for moving said latch means into said unlocked position;
second latch control means for moving said latch means into said locked position by resiliently biasing said latch means into said locked position; and
gas inlet means connected to said cap body member for supplying gas pressure into said cylinder chamber, said gas pressure causing the movement of said piston means and said first latch control means, said movement of said first latch control means causing said first latch control means to contact and urge said latch means into said unlocked position.

21. Filler cap apparatus in accordance with claim 20 in which the gas inlet means includes an inlet passage through the cap body member to the cylinder chamber, a gas conduit connected between said inlet passage and a source of pressurized gas.

22. Filler cap apparatus in accordance with claim 21 which also includes valve means connected to said conduit for selectively controlling the flow of gas in and out of said chamber.

* * * * *